US012663026B2

(12) United States Patent
Yudell

(10) Patent No.: US 12,663,026 B2
(45) Date of Patent: Jun. 23, 2026

(54) FIXED DISPLACEMENT HYDRAULIC PUMP MATCH FLOW DEMAND CONTROL SYSTEM

(71) Applicant: TEAM Industries, Inc., Bagley, MN (US)

(72) Inventor: Alexander C. Yudell, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 47 days.

(21) Appl. No.: 18/954,751

(22) Filed: Nov. 21, 2024

(65) Prior Publication Data

US 2025/0084874 A1 Mar. 13, 2025

Related U.S. Application Data

(63) Continuation of application No. 18/063,651, filed on Dec. 8, 2022, now Pat. No. 12,180,983.

(Continued)

(51) Int. Cl.
*F15B 13/04* (2006.01)
*F15B 13/044* (2006.01)

(52) U.S. Cl.
CPC ...... *F15B 13/0402* (2013.01); *F15B 13/0417* (2013.01); *F15B 13/0442* (2013.01);
(Continued)

(58) Field of Classification Search
CPC .............. F15B 13/0402; F15B 13/0417; F15B 13/0442; F15B 13/0433; F15B 13/06;
(Continued)

(56) References Cited

U.S. PATENT DOCUMENTS 4,041,983 A 8/1977 Bianchetta
4,121,501 A 10/1978 Finley
(Continued)

FOREIGN PATENT DOCUMENTS

KR 20150136436 A 12/2015
KR 101825961 B1 2/2018

OTHER PUBLICATIONS toyota-club.net, "Variable discharge oil pump", Jan. 2016-Jul. 2018, pp. 1 through 5, as downloaded on Nov. 30, 2021 from https://toyota-club.net/files/faq/16-01-01_faq_oil-pump_eng.htm.

(Continued)

*Primary Examiner* — Kelsey E Cary
(74) *Attorney, Agent, or Firm* — Fogg & Powers LLC

(57) ABSTRACT

A fixed displacement hydraulic pump match flow demand control system that includes a spool valve, a plurality of fixed displacement pumps and a control valve is provided. The spool valve includes a spool. The spool is configured to shuttle within a chamber of a housing based at least in part on a pressure difference between a first end and the second end of the chamber. A fluid flow from each fixed displacement pump of the plurality of fixed displacement pumps is in fluid communication with an associated input port to the spool valve. At least one output port of the spool valve is in fluid communication with a hydraulically operated device and at least one of another output port is in fluid communication with a return. The control valve is configured to adjust the location of the spool in the chamber to regulate fluid flow to the hydraulically operated device.

18 Claims, 13 Drawing Sheets

Related U.S. Application Data

(60) Provisional application No. 63/287,160, filed on Dec. 8, 2021.

(52) U.S. Cl.
CPC ............... *F15B 2211/20576* (2013.01); *F15B 2211/255* (2013.01); *Y10T 137/86131* (2015.04); *Y10T 137/86493* (2015.04)

(58) Field of Classification Search
CPC ...... F15B 2211/255; F15B 2211/20576; F15B 11/17; Y10T 137/86493; Y10T 137/86509; Y10T 137/86131; F16H 57/0435; F16H 57/0439; F16H 61/0021; F16H 61/0031; F16H 61/0269; F16H 61/0009; F16H 2061/0253; F16H 2061/0037; F16H 2061/0279; F16D 48/02; F16D 48/06; F16D 2048/0287; F16D 2048/029; F16D 2048/0293; G05D 16/04
See application file for complete search history.

(56) References Cited

U.S. PATENT DOCUMENTS

| | | | | |
|---|---|---|---|---|
| 5,052,179 | A | 10/1991 | Fujii | |
| 7,621,845 | B2 | 11/2009 | Soga | |
| 12,180,983 | B2 * | 12/2024 | Yudell ................ | F15B 13/0433 |
| 2015/0198183 | A1 | 7/2015 | Moser et al. | |
| 2019/0136878 | A1 | 5/2019 | Spangler | |
| 2023/0175533 | A1 | 6/2023 | Yudell | |

OTHER PUBLICATIONS

U.S. Patent and Trademark Office, "Notice of Allowance", U.S. Appl. No. 18/063,651, dated Aug. 21, 2024, pp. 1 through 7, Published: US.
U.S. Patent and Trademark Office, "Office Action", U.S. Appl. No. 18/063,651, dated May 30, 2024, pp. 1 through 11, Published: US.

* cited by examiner

FIXED DISPLACEMENT HYDRAULIC PUMP MATCH FLOW DEMAND CONTROL SYSTEM

CROSS-REFERENCE TO RELATED APPLICATIONS

This Application is a Continuation Application of U.S. application Ser. No. 18/063,651, filed on Dec. 8, 2022, same title herewith, which claims priority to U.S. Provisional Application No. 63/287,160 filed on Dec. 8, 2021, same title herewith, the contents of both Applications are incorporated herein in their entirety.

BACKGROUND

Hydraulically controlled devices, such as a transmission, may employ a displacement pump to generate hydraulic fluid flow. Two common types of pumps include a fixed displacement pump and a variable displacement pump. The advantages of a fixed displacement pump include simplicity, robustness, and cost over a variable displacement pump. A disadvantage of a fixed displacement pump, however, is that fluid flow from the pump cannot be controlled independently of the speed of a device that provides activation of the device. For example, in a transmission application, torque provided by a motor via crankshaft/gear/chain arrangement is typically used to activate a fixed displacement pump. As the motor's revolutions per minute (RPMs) increases or decreases, the fluid flow from an associated fixed displacement pump increases or decreases. Fixed displacement pumps are typically sized to provide adequate flow at idle for the transmission hydraulic system. At peak motor output speeds, however, fluid flow produced by the fixed displacement pump is typically more than what is needed by the system. This results in wasted power and driveline inefficiency.

For the reasons stated above and for other reasons stated below which will become apparent to those skilled in the art upon reading and understanding the present specification, there is a need in the art for a system with an effective and efficient fixed displacement pump arrangement.

SUMMARY OF INVENTION

The following summary is made by way of example and not by way of limitation. It is merely provided to aid the reader in understanding some of the aspects of the subject matter described. Embodiments provide a fixed displacement hydraulic pump match flow demand control system that uses a plurality of fixed pumps and a spool valve to regulate fluid flow in an effective and efficient manner.

In one embodiment, a fixed displacement hydraulic pump match flow demand control system is provided. The system includes a spool valve, plurality of displacement pumps, at least one line passage, at least one return passage and a control valve. The spool valve includes a housing and a spool. The housing has a chamber that includes a first end and a second end. The housing further has a plurality of input ports. Each input port passes through the housing into the chamber. The housing also has a plurality of output ports. Each output port passes from the chamber through the housing. The housing additionally has a control port passing through the housing to the first end of the chamber and a feedback port passing through the housing to the second end of the chamber. The spool is located within the chamber. The spool is configured to shuttle within chamber based at least in part on a pressure difference between the first end and the second end of the chamber. The spool includes a plurality of blocking sections configured to block at least a portion of at least one of the output ports based on a spool location within the chamber. The spool further includes at least one connection section coupled to space the plurality of the blocking sections. A fluid flow from each fixed displacement pump of the plurality of fixed displacement pumps is in fluid communication with an associated input port of the plurality of input ports of the housing of the spool valve. The least one line passage is in fluid communication with a hydraulically operated device. Each line passage of the at least one line passage is further in fluid communication with an associated one of the plurality of output ports of the spool valve. The at least one return passage is in fluid communication with at least one output port of the plurality of output ports of the spool valve. A line feedback passage is in fluid communication with the feedback port and the at least one line passage. Line pressure from the line feedback passage generates a line pressure force on the second end of the spool within the chamber. The control valve is in fluid communication with the control port of the spool valve. The control valve is configured to provide a select bias pressure that generates a select bias force on the first end of the spool within the chamber to adjust a location of the spool in the chamber to achieve a desired line pressure in the at least one line passage.

In another embodiment, a fixed displacement hydraulic pump match flow demand control system is provided. The system includes a spool valve, a first fixed displacement pump, at least one second displacement pump, a control valve, and a controller. The spool valve includes a hydraulic manifold and a spool. The hydraulic manifold includes a chamber that has a first end and a second end. The hydraulic manifold has a first input port and at least one second input port. Each first input port and the at least one second input port passes through the hydraulic manifold into the chamber. The hydraulic manifold further has a first output port and at least one second output port. Each first output port and the at least one second output port passes from the chamber through the hydraulic manifold. The hydraulic manifold further has a control port that passes through the hydraulic manifold to the first end of the chamber and a feedback port passing through the housing to the second end of the chamber. The spool is received within the chamber having a first end and a second end. The spool is configured to shuttle within chamber based at least in part on a pressure difference between the first end and the second end of the chamber. The spool valve includes a plurality of blocking sections that are configured to block at least a portion of at least one of the first output port and the at least one second output port based on a spool location within the chamber. The spool further includes a plurality of connection sections that are positioned to space the plurality of the blocking sections. An output of the first fixed displacement pump is in fluid communication with the first input port of the hydraulic manifold. An output of the at least one second fixed displacement pump is in fluid communication with the at least one second input port of the hydraulic manifold. At least one line passage is also provided to a hydraulically operated device. Each line passage of the at least one line passage being in fluid communication with an associated output port of the spool valve. Further at least one return passage is in fluid communication with an associated output port of the spool valve. The line feedback passage is in fluid communication with the feedback port and at least one line passage is also included. Line pressure from the line feedback passage generated a line pressure force on the second end of the spool within the chamber. The control valve is in fluid communication with the control port of the spool valve. The control valve is configured to provide a select bias pressure that generates a select bias force on the spool of the first end of the spool within the chamber to adjust a location of the spool in the chamber to achieve a desired line pressure in the at least one line passage. The controller the figure to provide a signal to the control valve relating to a desired line pressure.

In yet another embodiment, a method of operating a fixed displacement hydraulic pump match flow demand control system is provided. The method includes directing a first fluid flow from a first fixed displacement pump to a first input of a first pump spool gallery formed with a spool within a chamber of a housing of a spool valve; directing at least one second fluid flow from at least one second fixed displacement pump to at least one second input to at least one second pump spool gallery formed with the spool within the chamber of the housing of the spool valve; adjusting a bias pressure based on a received signal that indicated a desired line pressure to move the spool in the chamber of the housing of the spool valve, the bias pressure being in fluid communication with a pressure control spool gallery formed by an end of the spool within the chamber of the housing of the spool valve; wherein a fluid flow of at least one of a first output from the first pump spool gallery and at least one second output from the at least one second pump spool gallery is based on a position of the spool within a cavity of the housing of the spool valve, the first output and the at least one second output being in fluid communication with a hydraulically operated device.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a fixed displacement hydraulic pump match flow demand control system that uses a spool valve to regulate fluid flow from two or more pumps and a device with hydraulically operated features. Examples of a hydraulically operated device include, but are not limited to, transmissions such as an automated manual transmission, a dual clutch transmission, a planetary automatic transmission, and a continuously variable transmission (CVT) including a steel belt CVT. Examples of hydraulically controlled functions of the example transmissions include, but is not limited to, clutch activation, band brake actuation, cooling flow, lubrication flow, torque converter flow and lock up. In the CVT example the hydraulically controlled functions may include gear ratio variation with a hydraulically controlled actuator.

Figure 1:
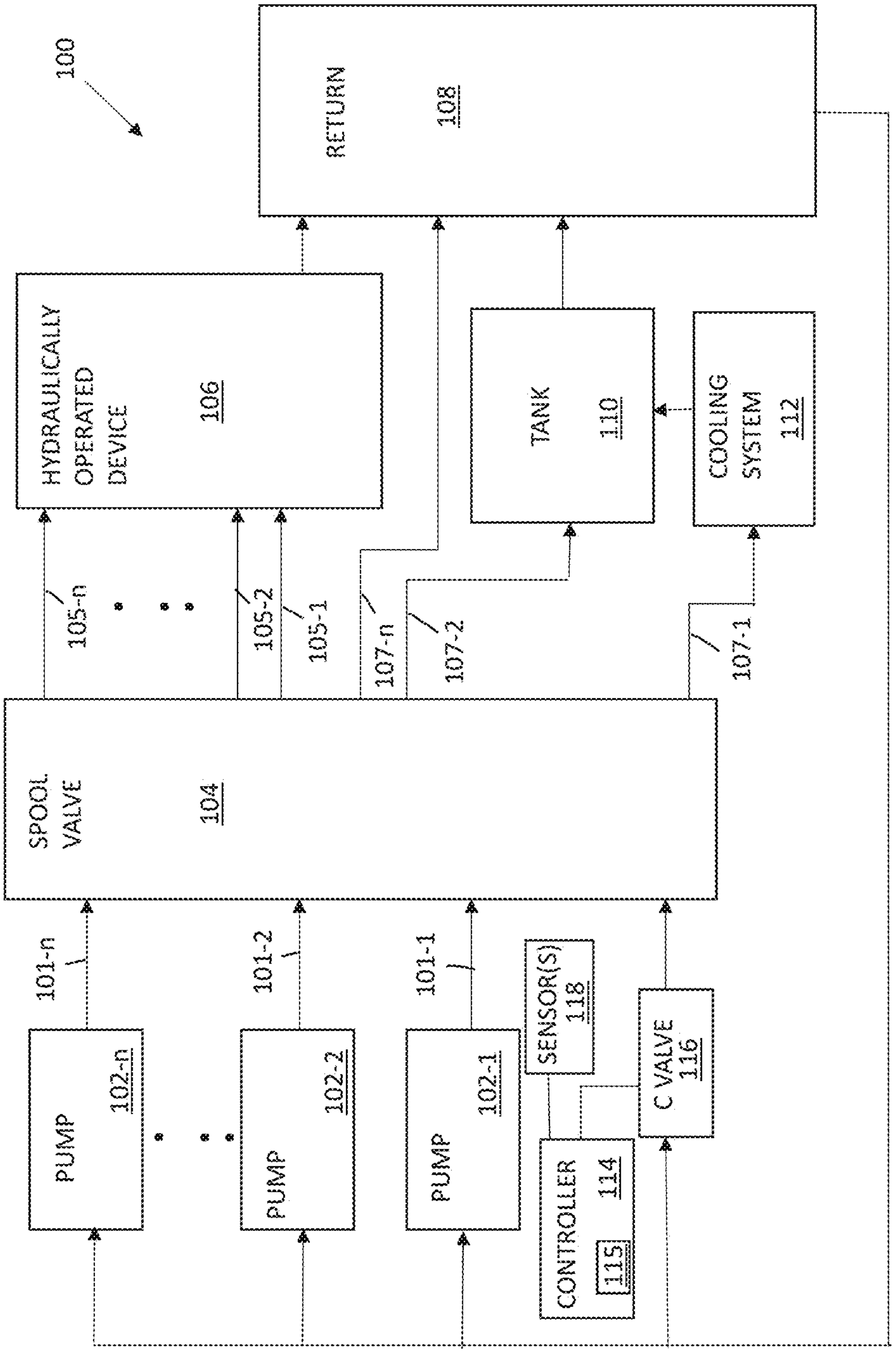
FIG. 1 is a block diagram of a fixed displacement hydraulic pump match flow demand control system according to one exemplary embodiment.

Referring to FIG. 1, a block diagram of a fixed displacement hydraulic pump match flow demand control system 100 is illustrated. In this example, a plurality of pumps 102-1 through **102-*n* provide fluid flow to a spool valve 104 through pump discharge passages 101-1 through 101-*n*. The pumps may be generally referenced by 102. An example fixed displacement type pump 102 that may be used is a gerotor pump. Other types of fixed displacement pumps may also be used. In one example embodiment, the pumps 102** are in parallel and are actuated with a same shaft.

The spool valve 104 is used to regulate the flow from the plurality of the pumps 102 to one or more input ports of a hydraulically operated device 106 through fluid communication line passages 105-1 through **105-*n*. The fluid communication line passages may be generally referenced as line passages 105. As discussed above, an example of a hydraulically operated device includes a CVT in which the gear ratio is controlled by a hydraulically controlled actuator. Fluid from the pumps 102 not flowing to the hydraulically operated device 106 is directed to at least one of, a reserve tank 110, a cooling system 112 or directly to a return 108 in this example through pump return passages 107-1 through 107-*n*. The cooling system 112 (or cooling loop) as illustrated is part of a return path to the return 108. Further other low pressure hydraulic elements may be positioned within the return path. The fluid is returned to the pumps 102 via return 108** in this example (it is a closed loop system in this example).

The fixed displacement hydraulic pump match flow demand control system 100 in this example, includes a controller 114. In general, the controller may include any one or more of a processor, microprocessor, a digital signal processor (DSP), an application specific integrated circuit (ASIC), a field program gate array (FPGA), or equivalent discrete or integrated logic circuitry. In some example embodiments, controller 114 may include multiple components, such as any combination of one or more microprocessors, one or more controllers, one or more DSPs, one or more ASICs, one or more FPGAs, as well as other discrete or integrated logic circuitry. The functions attributed to the controller 114 herein may be embodied as software, firmware, hardware or any combination thereof. The controller 114 may be part of a system controller or a component controller such as, for example, a transmission controller. The controller 114 may include a memory 115 which may include computer-readable operating instructions that, when executed by the controller 114 provides functions of the fixed displacement hydraulic pump match flow demand control system 100. Such functions may include the functions of setting a configuration of the spool valve described below. The computer readable instructions may be encoded within the memory 115. Memory 115 is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically-erasable programmable ROM (EEPROM), flash memory, or any other storage medium.

In other embodiments, the controller is another type of device that provides a signal, such as a current, to the control valve 116. For example, the controller 114 may be a simple switch, rheostat etc. The controller 114 controls a control valve 116 in this example. In one example, the control valve 116 is an electric solenoid that acts directly on a spool of the spool valve 104 that contains a main fluid flow path. In another example the control valve 116 is a pilot valve that manipulates the pressure that acts on a first end of a spool of the spool valve 104 as discussed below. In this example, the spool valve is indirectly controlled or "pilot operated," via the controller 114. The amount of control pressure dispensed to the spool valve 104 by the control valve 116 is controlled by a current input provided by the controller 114. The controller 114 determines a current input based on inputs from one or more sensors 118 in one example. The sensors may include, but are not limited to, speed sensors, RPM sensors, etc. In one example, the controller 114 is logic built within the spool valve 104. In another example, the pressure in is controlled by a fixed relief valve, resulting in a fixed line pressure. Further, in another embodiment discussed below, the controller 114 includes a pilot regulating valve 602.

The pumps 102 are fixed displacement pumps in this example. Fixed displacement pumps typically spin at some ratio of engine speed determined by a fixed gear or chain sprocket ratio in a vehicle application. The fixed displacement pumps 102 are generally sized to meet the hydraulic system flow demand at engine idle. As discussed above, an issue with using a fixed displacement pump is that at higher RPMs too much flow is produced by the pump. For example, if a fixed pump is designed to achieve a flow rate of 14 liters per minute when idling at 1400 RPMs, when the engine is revving at 8500 RPMs it may produce a flow of 85 liters per minute. However, a hydraulically operated device may only need about 20 liters per minute at this RPM. In this example, 65 liters per minute or about ⅔ of the power being consumed by the pump is being wasted.

Embodiments reduce the energy waste by using at least two smaller fixed pumps to achieve the desired flow rate at idle. The full fluid flow produced from the smaller pumps is used to generate the desired fluid flow at idle for the hydraulically operated device 106.

There are two aspects to pump power consumption. The first relates the pump hydraulic power production which equals the flow rate times the pressure and the other aspect relates to viscous losses due to friction in the fluid layers between the pump and housing. By using at least two smaller pumps instead of one larger pump it is possible to reduce the pump power drive losses by redirecting the fluid flow of at least one of the pumps during higher RPMs to a return or tank thus reducing the pump pressure on that particular pump to a low value. Further, using smaller diameter pumps reduces the viscous consumption since the viscous drag on the pump is proportional to a third and fourth power of the diameter of the pump. When going from one larger pump to two smaller pumps, the pump diameter can be decreased, therefore the total viscous drag will be reduced, even though we have two pumps instead of one. The gain in brake power may be used to increase acceleration in a vehicle application and improve fuel efficiency. Additionally, due to less heat generation, this system reduces the size of a needed cooling system. Being able to reduce the size of a cooling system not only provides the advantage of a reduced cooing system size, it also significantly reduces the cost of the cooling system.

Figure 2A:
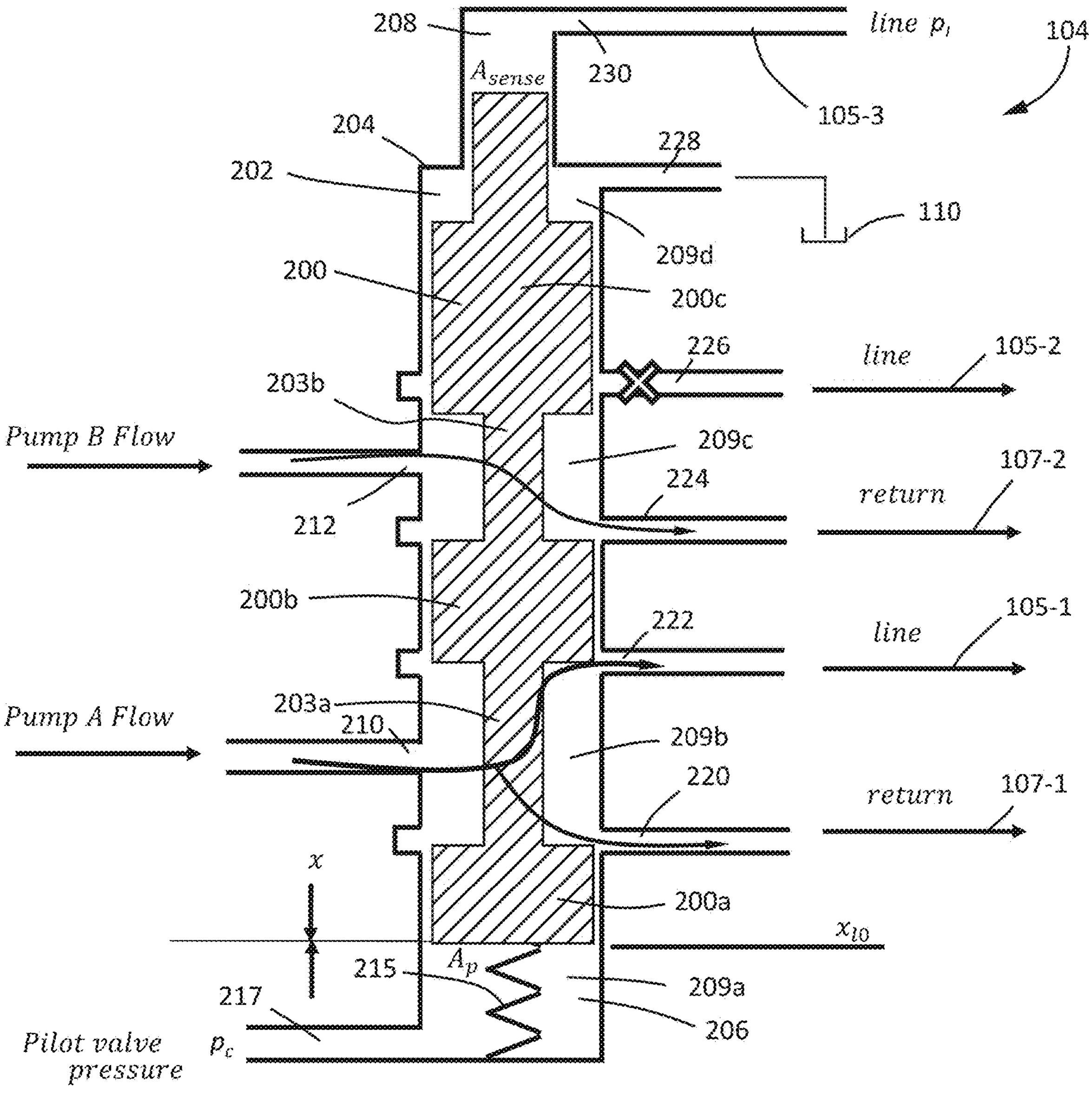
FIG. 2A illustrates a spool valve in a low flow demand configuration according to one exemplary embodiment.

Referring to FIG. 2A, an example of a spool valve 104 is illustrated. A spool 200 is contained within a chamber 202 of a housing 204. The spool 200 includes a plurality of wide blocking sections **200*a*, 200*b*, and 200*c* that are connected by connection sections 203*a* and 203*b* that space the blocking sections 200*a*, 200*b* and 200*c*. The spool 200 is designed to shuttle back and forth between a first end 206 and a second end 208 in the chamber 202 to direct fluid flow from the pumps 102. In this example, two pumps, such as pumps 102-1 and 102-2 discussed above are used. The pumps can be referred to as a first pump or pump A and a second pump or pump B. The configuration of the spool 200 in the chamber 202 forms a first spool gallery 209*a*, a pump A spool gallery 209*b*, a pump B spool gallery 209*c* and a second spool gallery 209*d* in this example. A spool bias member 215 is positioned in the first end 206 of the chamber 202 (i.e., the first spool gallery 209*a*) between the housing 204 and a first end of the spool 200 to position the spool 200 in a desired location within the chamber 202** at a select default pressure.

The housing 204 (or hydraulic manifold) of the spool valve 104 includes a plurality of inputs ports 210 and 212 passing through the housing 204 into the chamber 202 and a plurality of output ports 220, 222, 224, 226 and 228 passing out of the chamber 202 through the housing 204. Input port 210 is in fluid communication with a pump A discharge passage to receive pump A fluid flow from a pump A and input port 212 is in fluid communication with a pump B discharge passage to receive pump B fluid flow from a pump B. Further in this example, output port 220 is in fluid communication with a pump A return passage 107-1 to the return 108, output port 222 is in fluid communication with a pump A line passage 105-1, output port 224 is in fluid communication with a pump B return passage 107-2 to the return 108, output port 226 is in fluid communication with a pump B line passage 105-2 and output port 228 is in fluid communication with a return tank 110. The line passages are in fluid communication with the hydraulically operated device 106. The housing 204 further includes a control input port 217 to the first end 206 of the chamber 202. Pilot valve pressure $p_c$ is provided by the control valve 116 through the control input port 217. Also, in this example, a feedback port 230 is in fluid communication with a line passage 105-3 (which is a line feedback passage in this example) to the hydraulically operated device 106.

The control valve 116 may be a solenoid valve that acts as a current to pressure converter. Current that corresponds to a particular pressure is applied to the solenoid valve 116 to deliver select pilot value pressure in the control input port 217 to the chamber 202 of the spool valve 104. The current may be provided by any type of controller 114 such as a transmission controller, rheostat, switch etc. A linear solenoid valve 116 that can deliver a smooth, continuous, and selectable pressure is the control input port 217 between a defined low pressure and a defined maximum pressure. The fluid pressure provided by the solenoid valve 116 adjusts the position of the spool 200 within the chamber 202 to regulate the fluid flow from the first pump 102-1 and the second pump 102-2 to the line passages 105-1, 105-2, and 105-3 and the return 107 resulting in different desired configurations of the spool valve 104.

The design of the spool valve 104 results in an equalization in force between the control pressure $p_c$ at the first end 206 the chamber 202 via the control input port 217 that asserts a bias force on a first end of spool 200 and line pressure $p_l$ that asserts a line pressure force on a second end of the spool 200 at the second end 208 of the chamber 202 after a change in $p_c$ is generated by the control valve 116. During the equalization process, the spool 200 shuttles slightly about a configuration point within the chamber 202 while the spool 200 directs fluid flow through the line passages 105 and returns 107 until a force balance is reached on the spool 200. Shifting between the configurations, spool valve 104 are shown in FIGS. 2A through 2D is a continuous process.

As discussed above, the linear solenoid valve 116 delivers a smooth, continuous, and selectable pressure (bias pressure). The linear solenoid valve 116 in this example is a current to pressure converter. A signal such as a current that corresponds to a select pressure, generated by the controller 114, is used by the linear solenoid valve 116 to deliver a bias pressure to the spool valve 104. A higher force in the first spool gallery 209*a* at the first end 206 of the chamber 202 caused by the bias pressure than a current force at the second end 208 of the chamber 202 causes the shuttle 200 to move towards the second end 208 of the chamber 202 changing the fluid flow out of select output ports. Once the demand pressure equals the line pressure, the forces on the spool 200 equalize and the spool 200 sits in a steady state position. Any excess flow from the pumps not needed to achieve the line pressure demand is directed to the return. Further, when the force generated by line pressure exceeds the force generated by the demand or bias pressure, the spool will shuttle towards the first end 206 of the chamber 202.

FIG. 2A illustrates a configuration set for low flow demand. In this configuration, the spool 200 of the spool valve 104 is positioned to meter fluid flow from the first pump 102-1 to a line passage 105-1 while blocking fluid flow from the second pump to line passage 105-2. This configuration may occur at high RPM where the pumps 102-1 and 102-2 are generating relatively high fluid flow. As illustrated, a portion of blocking section 200*c* of the spool 200 is positioned to block the output port 226 to a line passage 105-2 so the fluid flow of the pump B 102-2 is directed through output port 224 to the return 108. The discharge of the fluid flow from the second pump fluid flow through output port 224 to the return 108 through line passage 107-2 occurs with little pressure rise relative to the ambient pressure return. Return will be lower than line pressure but may be above ambient pressure. In an embodiment, return pressure is relieved at moderate pressure for the operation of low-pressure hydraulic elements. Hence, little hydraulic pumping power draw occurs on the second pump 102-2. A portion of the fluid flow from the first pump 102-1 (pump A) is directed though output port 222 to a line passage 105-1 to operate the hydraulically operated device 106. Excess flow from the first pump fluid flow is directed back to the return 108 through output port 220 to return passage 107-1.

A force balance is used to move the spool within the chamber 202. When the net force on a mass (spool mass) is zero, the spool does not accelerate in any direction. The stable point is where spool acceleration and velocity are zero. To move the spool to the low demand configuration, bias pressure from the control valve 116 is reduced so the pressure in first end 206 of the chamber 202 is less than the pressure in the second end 208 of the chamber 202. As a result, the pressure in the second end 208 of chamber 202 pushes the spool 200 downwards towards the first end 206 of the chamber 202 therein positioning the spool 200 as desired to regulate the fluid flow of the pumps 102-1 and 102-2.

Pressures need not be the same for force balance in examples because of the unequal areas at either end of the valve that the pressure acts upon. For example, area $A_p$ of a first end of the spool 200 (at the first blocking section 200*a*) is larger than area $A_{sense}$ at the second end of the spool 200. This configuration allows control of the spool 200 within the chamber 202 over higher pressure than the control valve 116 can deliver. As discussed above the spool 200 becomes static when the force at in the second end 208 of the chamber 202 is equal to the force at the first end 206. Since force equals pressure times area, if $A_{sense}$ is less than $A_p$, then a pressure ($p_c$) at the first end 206 of the chamber has to be less than the pressure ($p_l$) at the second end 208 of the chamber 202 to deliver force balance on the spool. This is important when the solenoid pressure $p_c$ available is lower than a maximum line pressure.

Figure 2B:
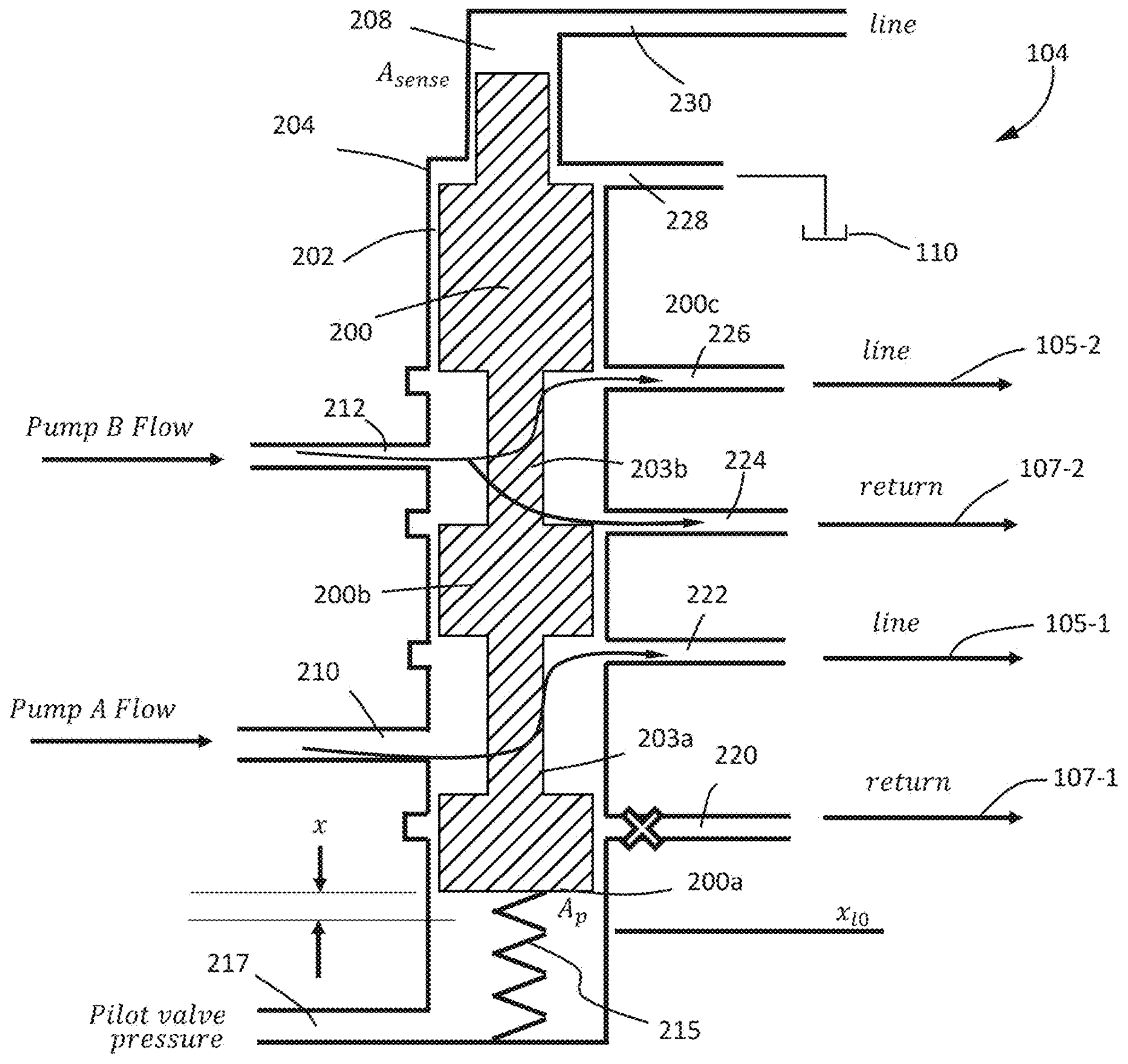
FIG. 2B illustrates the spool valve of FIG. 2A in a moderate flow demand configuration.

FIG. 2B illustrates a moderate flow demand configuration. In this configuration the spool valve 104 allows the total fluid flow from the first pump 102-1 to pass through output port 222 to line passage 105-1. The fluid flow from the second pump, however, is metered to allow the fluid flow to partially flow through output port 226 to line passage 105-2 and through output port 224 to the return 108 through return passage 107-2. Both the first pump 102-1 and the second pump 102-2 discharges at line pressure.

To move the spool 200 to achieve this second moderate flow configuration from the first moderate flow demand configuration discussed above, pressure from the control valve 116 is again slightly increased so the pressure in first end 206 of the chamber 202 is slightly more than the pressure in the second end 208 of the chamber 202. As a result, the pressure in the first end 206 of the chamber 202 pushes the spool 200 upwards towards the second end 208 of the chamber 202 therein positioning the spool 200 as desired to regulate the fluid flow of the pumps 102-1 and 102-2. Conversely, a drop in line pressure due to increase load flow demand may cause the same imbalance, given a fixed control pressure.

Further metering at the return passage may be used. Metering is the usage of an orifice, either fixed or variable to raise pressure (flow source) or lower flow (pressure source). In examples, the pumps are flow sources, so the spool reduces the size of the return passage to increase the pressure in the pump A or B spool gallery 209*b* and 209*c* and force flow to the line.

Figure 2C:
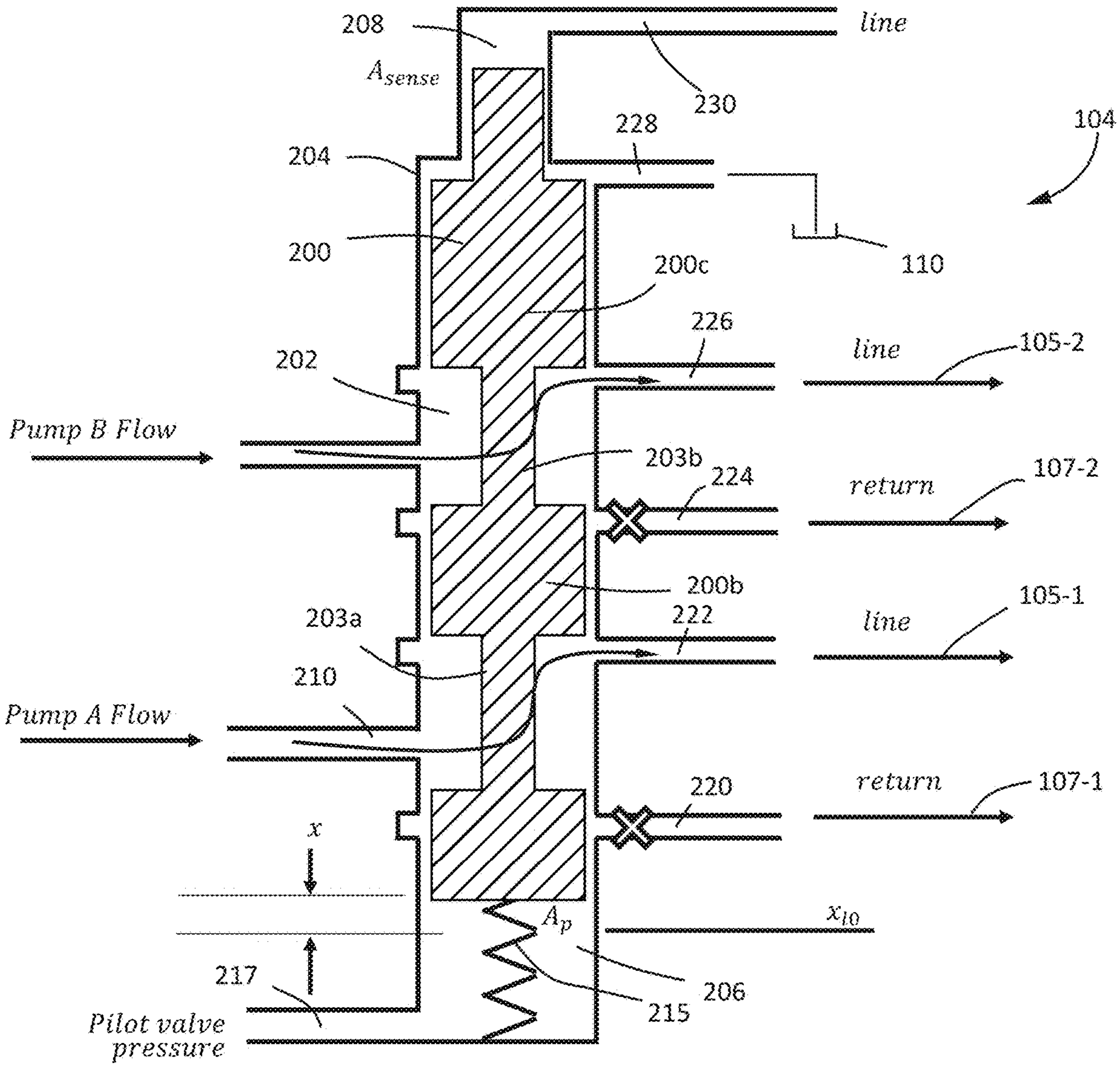
FIG. 2C illustrates the spool valve of FIG. 2A in a high flow demand configuration.

FIG. 2C illustrates a maximal flow demand configuration that may be used during the idle, or during high system flow demand such as rapid CVT gear ratio shifting. In this configuration, the spool 200 of the spool valve 104 is positioned to allow all the fluid flow from the first pump 102-1 through output port 222 to line passage 105-1 and all the fluid flow from the second pump 102-2 to flow through output port 226 to line passage 105-2. Both the first and second pumps discharge at line pressure.

To move the spool 200 to achieve high flow configuration from other flow demand configurations discussed above, pressure from the control valve 116 is increased so the pressure in first end 206 of the chamber 202 is more than the pressure in the second end 208 of the chamber 202. As a result, the pressure in the first end 206 of the chamber 202 pushes the spool 200 upwards towards the second end 208 of the chamber 202 therein positioning the spool 200 as desired to regulate the fluid flow of the pumps 102-1 and 102-2. Conversely, a drop in line pressure due to increase load flow demand may cause the same imbalance, given a fixed control pressure.

Figure 2D:
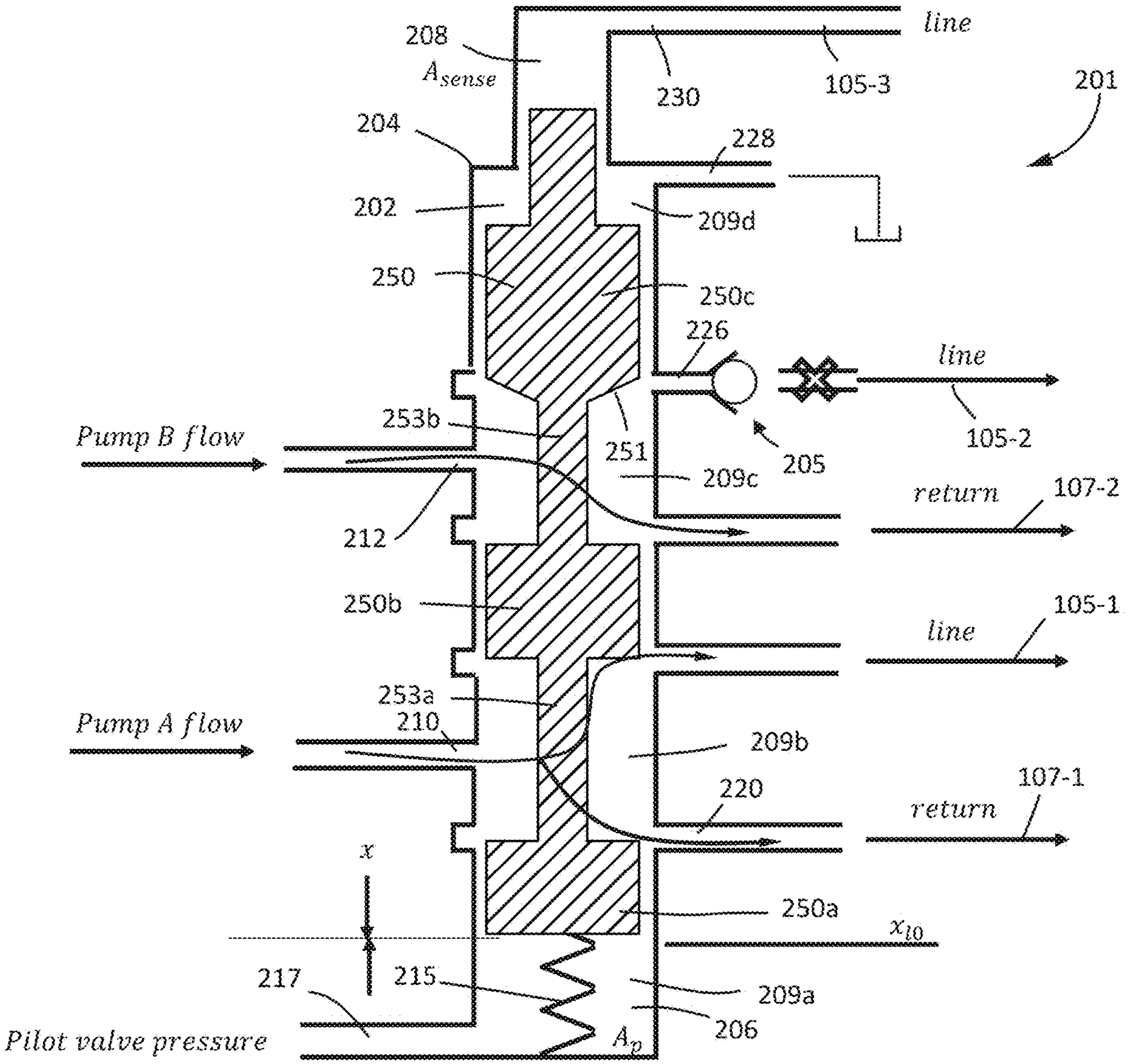
FIG. 2D illustrates a spool valve that includes a check valve in a low flow demand configuration according to one exemplary embodiment.
Figure 2E:
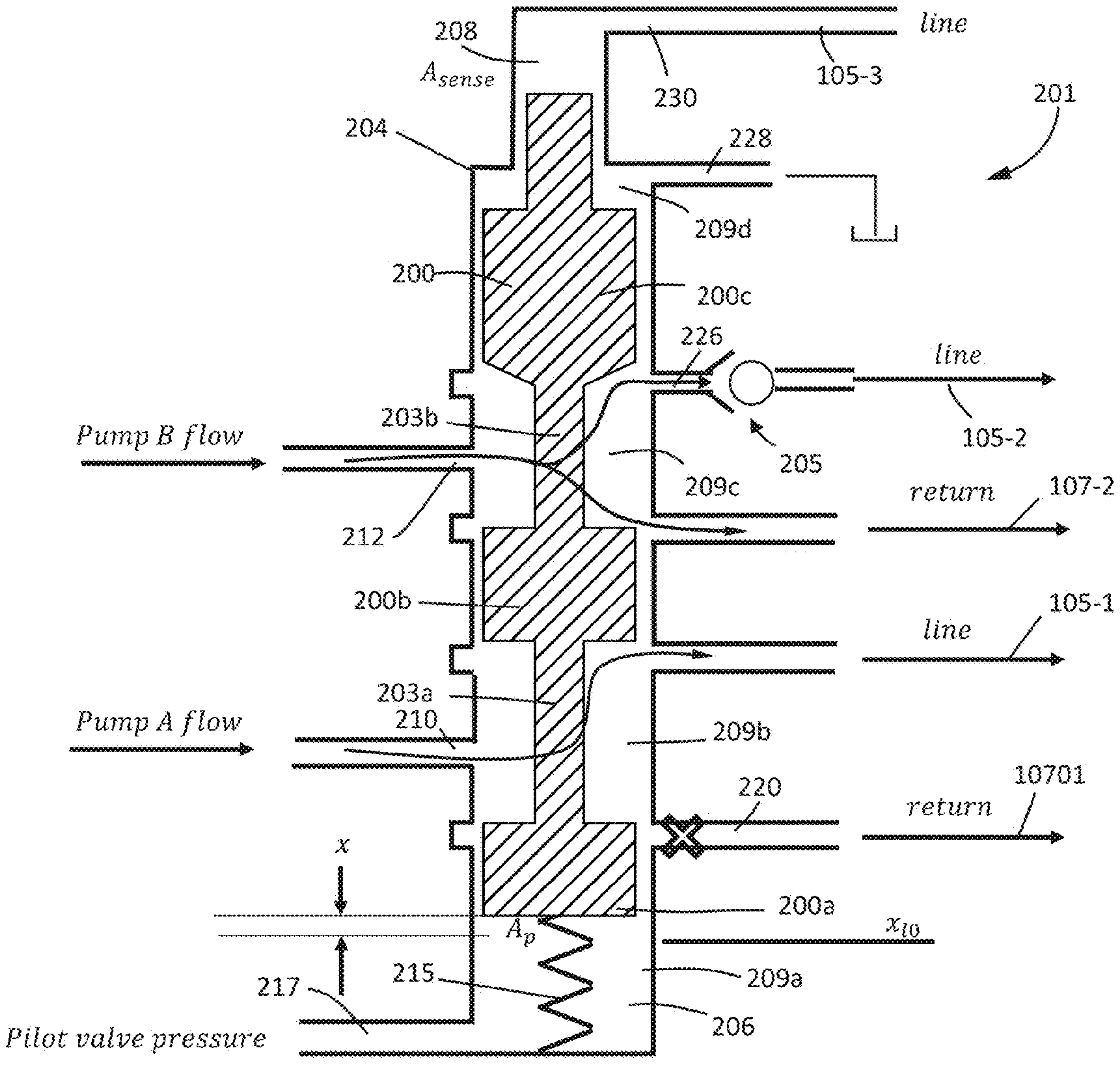
FIG. 2E illustrates the spool valve of FIG. 2D in a moderate flow demand configuration.
Figure 2F:
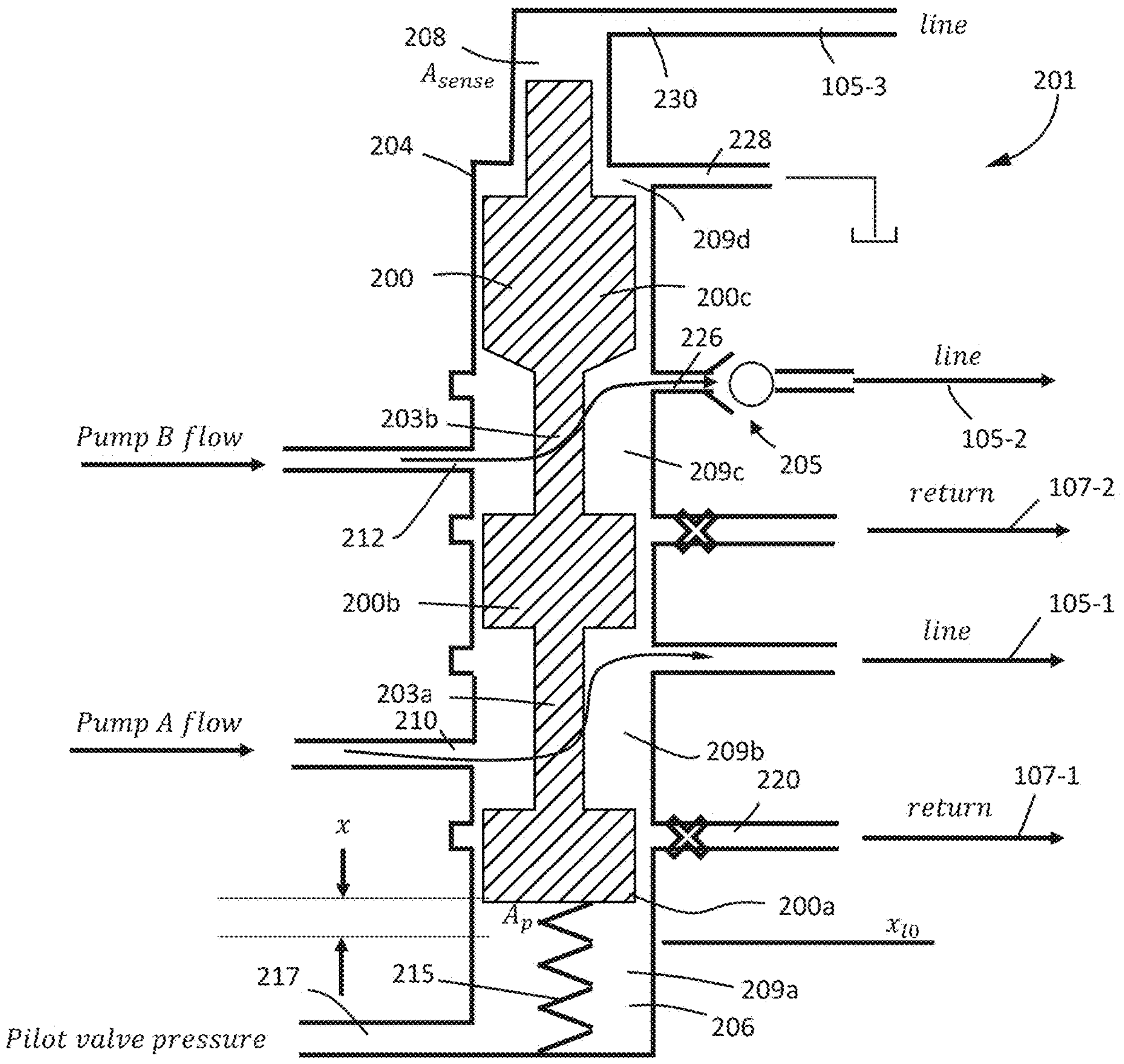
FIG. 2F illustrates the spool valve of FIG. 2D in a high flow demand configuration.

A spool valve 201 that is check metered in another example is illustrated in FIGS. 2D through 2F. In this example, a check valve 205 is positioned in line passage 105-2 near output port 226. The use of the check valve allows for independent control of the hydraulic fluid through line passage 105-2 no matter the position of blocking section 200*c* of the spool 200. The spool 250 in this example includes a plurality of wide blocking sections 250*a*, 250*b*, and 250*c* that are connected by connection sections 253*a* and 253*b*. Blocking section 250*c* in this example includes a tapered end face 251.

FIG. 2D illustrates the spool valve 201 in a low flow demand configuration. The spool 200 of the spool valve 201 meters flow from pump A 102-1 to line passage 105-1. In another example, a hydraulic resistance is introduced into line passage 105-3. The resistance may be an orifice to provide damping on the feedback circuit. Excess flow from pump A 102-1 is directed to return passage 107-1. Pump A discharge is at line pressure. Flow from pump B 102-2 is directed to return passage 107-2 in this configuration. Pump B discharge is at return pressure. The hydraulic power draw will be minimal because the return pressure in the return passages is low relative to line pressure in the line passages. Check valve 205 in this configuration is reversed biased, as line pressure is higher than pump B pressure. The reversed biased check valve 205 blocks back flow from line passage 105-2 from entering the pump B spool gallery 209*c*.

FIG. 2E illustrates the spool valve 201 in a moderate flow demand. All fluid flow from pump A 102-1 proceeds to line passage 105-1. Pump A discharge is at line pressure. Flow from pump B 102-2 is metered to line passage 105-2. Excess flow from pump B 102-2 is redirected to suction through return passage 107-2. Pump B discharge is at line pressure. Check valve 205 is forward biased in this configuration therein allowing flow from pump B 102-2 to satisfy hydraulic system flow demand.

FIG. 2F illustrates the spool valve 201 in a high flow demand configuration. In this configuration all fluid flow from pump A 102-1 precedes to line passage 105-1. Pump A discharge is at line pressure. All fluid flow from pump B 102-2 proceeds to line passage 105-2. Pump B discharge is at line pressure. The check valve 205 is forward biased in this configuration therein allowing flow from pump B 102-2 to feed line passage 105-2 demand.

Figure 3:
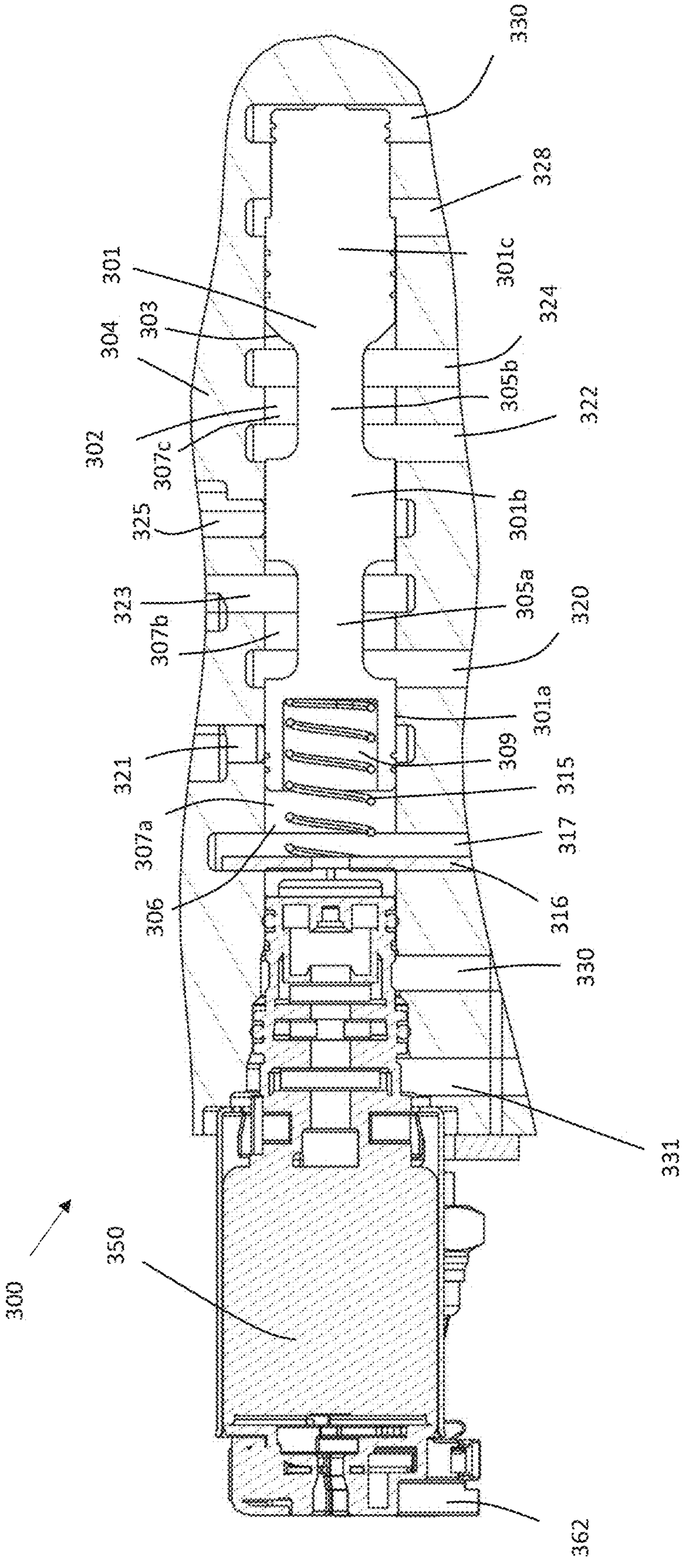
FIG. 3 is a partial cross-sectional portion of a fixed displacement hydraulic pump match flow demand control system according to one exemplary embodiment.

FIG. 3 illustrates a cross-sectional portion of a fixed displacement hydraulic pump match flow demand control system 300. FIG. 3 illustrates a pilot valve 350 which provides pilot valve pressure through input port 317 into the first end 306 of chamber 302 in which the spool 301 is received. In this example, the pilot valve 350 is a linear solenoid valve that includes a pilot valve electrical connector 362 used to the linear solenoid valve. The chamber 302 is formed in a housing or hydraulic manifold 304. The hydraulic manifold 304 may be made for example, of an aluminum casting, a machined aluminum manifold, a cast iron manifold, etc. that, for example, receives the spool 301 and the pilot valve 350.

The spool 301 in this example includes wide blocking sections 301*a*, 301*b*, and 301*c* that are connected by connection sections 305*a* and 305*b*. Blocking section 303*c* in this example includes a tapered end face 303. Blocking section 301*a* in this example, includes a spring seat cavity 309 to receive an end of a valve bias member 315. The valve bias member 315 is positioned between a first end of the chamber 302 and an end of blocking section 301*a* in spool gallery 307*a* that receives the pilot valve pressure through input port 317. The pilot valve pressure acts on an end of the spool 301 to bias the spool 301 to selectively route pump fluid flow to line passages.

In one example a spring retaining plate 316 is used to engage an end of the valve bias member 315. The spring retaining plate 316 is designed to retain the valve bias member 315 and react spring load. The valve bias member 315 is used, in one example, to bias the spool 301 to a "normally high" pressure condition. In another example, the valve bias member 315 may be used to bias the spool 301 to a "normally low" condition.

The hydraulic manifold 304 and wide blocking sections 301*a*, 301*b*, and 301*c* of the spool form a spool gallery 307*a*, a pump A spool gallery 307*b* and a pump B spool gallery 307*c* in the spool valve. Further illustrated in FIG. 3 are discharge or input ports and return or output ports. The input ports include a pump A input port 320. Pump A fluid flow is received in the pump A spool gallery 307*b* of the spool valve through the pump A input port 320. A pump A output port 321 is in fluid communication with a return passage. Further, pump A output port 323 allows fluid flow to be directed to a line passage. A pump B input port 322 provides fluid flow to the pump B spool gallery 307*c* of the spool valve. Pump B output port 324 provides fluid flow to a line passage. Further pump B output port 325 is in fluid communication with a return passage.

The hydraulic manifold 304 further includes a line pressure feedback port 328 (or feedback port). The line pressure feedback port 328 is in fluid communication with line pressure in a line passage and serves to bias the spool 301 back towards sending both pumps to return pressure. This allows the pilot pressure force to be balanced. Some embodiments may include an orifice element between the line passage and the line pressure feedback port 328 to act as a damping on the spool 301. The pressure on the feedback in this embodiment acts on a small step in the spool 301. In another embodiment, the line pressure feedback port 328 is vented to a reservoir, and feedback pressure is provided to another port.

A reservoir vent 330 is located at a second end of the spool 301 and is vented to a reservoir to avoid pressure/force buildup and causing unwanted spool biasing. Further included in the hydraulic manifold 304 is pilot pressure feed 331 which is used to regulate pressure fed to the pilot valve 350.

Figure 4:
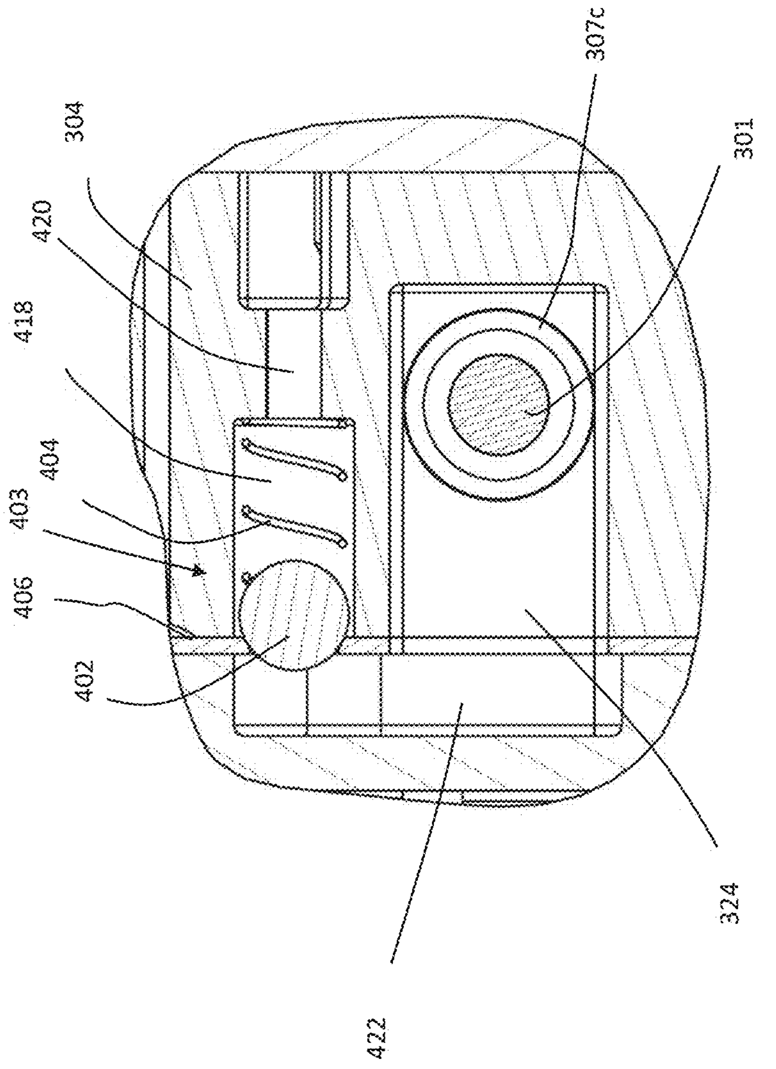
FIG. 4 is a partial cross-sectional side view of a hydraulic manifold illustrating the use of a check valve according to one exemplary embodiment.

FIG. 4 illustrates a partial cross-sectional side view of the hydraulic manifold 304 illustrating the use of a check valve 403 in communication with the pump B output port 324 discussed above. The check valve 403 includes a check ball 402 and a check valve biasing member 404 positioned within a check valve passage 418. Instead of a check ball 402, other embodiments may use a poppet, a reed valve, or a spool. The check valve biasing member 404 biases the check ball 402 to a closed position.

A separator plate 406 includes passages to direct hydraulic flow between hydraulic passage 422, that is in communication with the pump B output port 324, and a hydraulic passage 420 via the check valve 403. The pump B output port 324 is in fluid communication with the pump B spool gallery 307*c* in this example.

Figure 5:
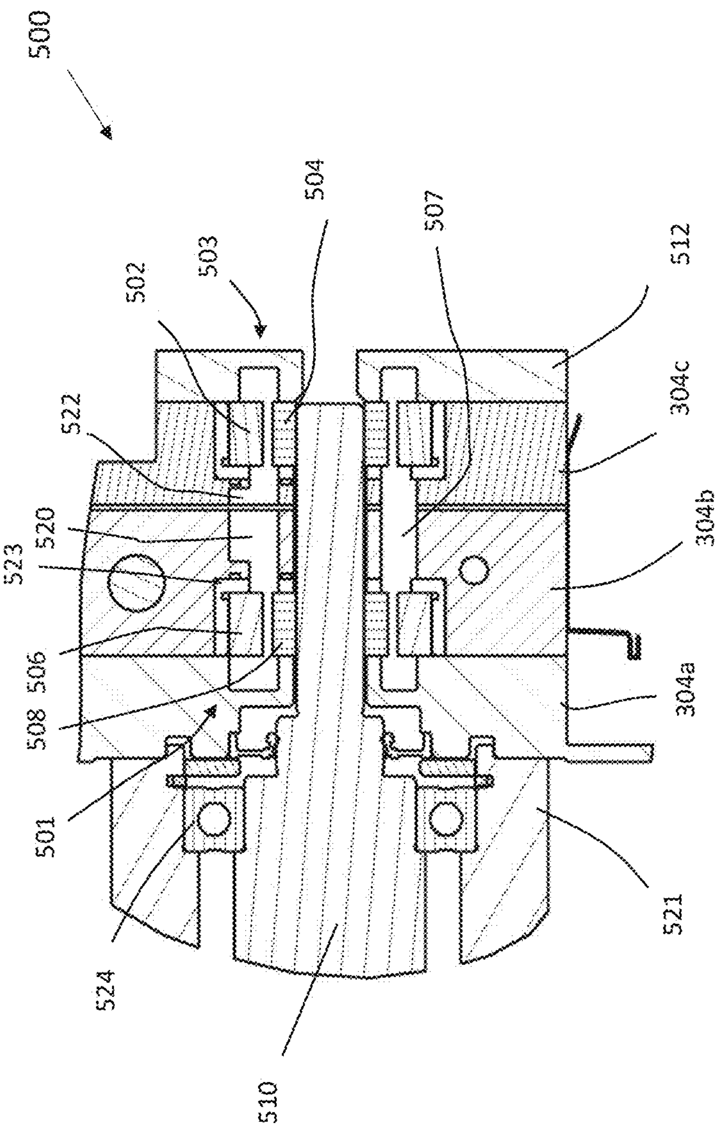
FIG. 5 is a partial cross-sectional view of a pump system according to one exemplary embodiment.

FIG. 5 illustrates a partial cross-sectional view of a pump system 500 that provides pump A and pump B pressure. The pump system 500 includes pump A 501 which includes a pump A outer rotor 506 and pump A inner rotor 508 that pumps hydraulic fluid to the pump A discharge passage 520. The pump system 500 further includes pump B 503 which includes a pump B outer router 502 and pump B inner router 504 that pumps hydraulic fluid to the pump B discharge passage 522. Further illustrated in a common pump suction gallery 507 where fluid flows into the two pumps 501 and 503. In another example, each pump, 501 and 503, may have its own unique suction gallery. The suction is on the side of the pump that draws low pressure in and the discharge is on the side of the pump that expels higher pressure flow.

The pump system 500 further includes a pump shaft 510 and pump cover 512. The example also includes a pump cup 523. Other embodiments do not use a pump cup. The pump cup 523 in an example, is made out of material that matches the thermal expansion properties of the pumps 501 and 503.

The pump system 500 also includes hydraulic manifold portions 304*a*, 304*b* and 304*c* that form part of the hydraulic manifold 304 discussed above. Further, a pump shaft support element 521 is spaced from the pump shaft 510 via pump shaft bearing 524 is also illustrated in FIG. 5.

Figure 6:
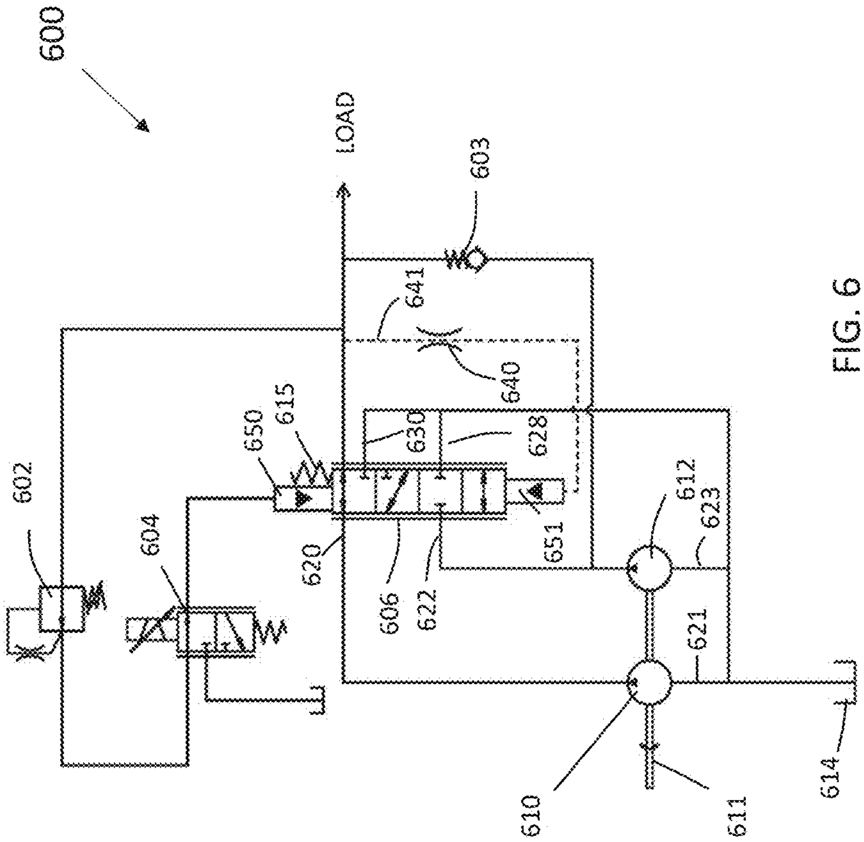
FIG. 6 illustrates a hydraulic schematic diagram of a fixed displacement hydraulic pump match flow demand control system according to one exemplary embodiment.

Referring to FIG. 6, a hydraulic schematic diagram of a fixed displacement hydraulic pump match flow demand control system 600 with check valve used to regulate the flow direction from the pump B line port in an example is illustrated. The hydraulic schematic diagram includes a pilot regulating valve 602. The pilot regulating valve 602 includes an input that is in communication with a load, or line pressure, and an output that is in communication with an input of a pilot valve 604. The pilot regulating valve 602 regulates variable line pressure down to a constant lower value that is supplied to the pilot valve 604.

The pilot valve 604 in one example is a linear solenoid valve. The linear solenoid valve acts as a continuously adjustable regulating valve that regulates downstream pressure in response to an electrical input. The electrical input may come from a controller 114. The controller 114 for example may be a transmission controller in a transmission application or any type of controller that provides and electrical input such as, but not limited to, a rheostat, switch, etc. The pilot valve 604 provides a biasing force via flow pressure at the first biasing input 650 which ultimately sets the line pressure to the load (the hydraulically operated device).

In an example, the pilot valve 604 delivers a bias pressure to a first spool biasing input 650 of the spool valve 606. In another example, the pilot valve 604 may be an electronically controlled relief valve or a proportional valve. In another example, a linear actuator may be used to provide the biasing force on the spool instead of a hydraulic valve.

The spool valve 606 in this example includes a pump A three-way valve and a pump B two-way valve. The spool valve 606 includes a pump A discharge passage 620 in communication to an output of pump A 610 and a pump B discharge passage 622 in communication with an output of pump B 612. Pump suction line passages 621 and 623 provide fluid communication between a reservoir tank 614 and inputs to pump A 610 and pump B 612. A pump A return passage 630 and a pump B return passage 628 from the spool valve 606 to the tank 614 is also illustrated in FIG. 6. The two pumps, pump A 610 and pump B 612, are being turned by a common pump shaft 611.

Further, an anti-reverse check valve 603 is coupled between the load and a fluid communication passage between the output of pump B and the pump B discharge passage 622. Also illustrated in FIG. 6 is a line pressure feedback member 640 in a feedback path 641 that is coupled between the load and a second biasing input member 651 at a second end of the spool valve 606. In one embodiment, the line pressure feedback member 640 includes a spool feedback damping orifice. Further in an example, it is a hydraulic orifice. Other devices that generate hydraulic resistance may also be used.

A valve biasing member 615 normally biases the spool valve 606 in this example, into a position where fluid flow from pump A 610 is connected to the load. The fluid flow from pump B, in this relaxed state of the spool valve 606, is blocked from the pump B return passage 628 and sent to the load through check valve 603. As pressure increases in the feedback path 641, the second biasing input member 651 at the second end of the spool valve 606 pushes a spool in the spool valve countering the biasing force of the valve biasing member 615. Varying fluid pressure at the load is delivered with the pump system 600. Depending on the load flow demand, there may be a point where all the flow from pump A and Pump B is directed back to the return 628 or 630. When all the flow goes to the return there is a drop in pressure which results in a reverse bias across the check valve 603 causing the check valve 603 to reverse bias and not allow fluid backflow from the load to pump B. Eventually there will come a point where pump A is going to be needed to deliver some flow to the load and some of the flow back to return. In this intermediate state, if there is some kind of pressure demand change, for example the load was requiring high pressure, and now is only requiring moderate pressure (pressure demand decrease), the spool valve will direct all of the pump A and pump B fluid flow to the return. In his case, the line to the load is going to bleed off and then once the line has bled off, biasing pressure at 651 will be low, causing the spool of the spool valve 606 to move and start communicating some of the flow back to the load instead of the return.

Figure 7:
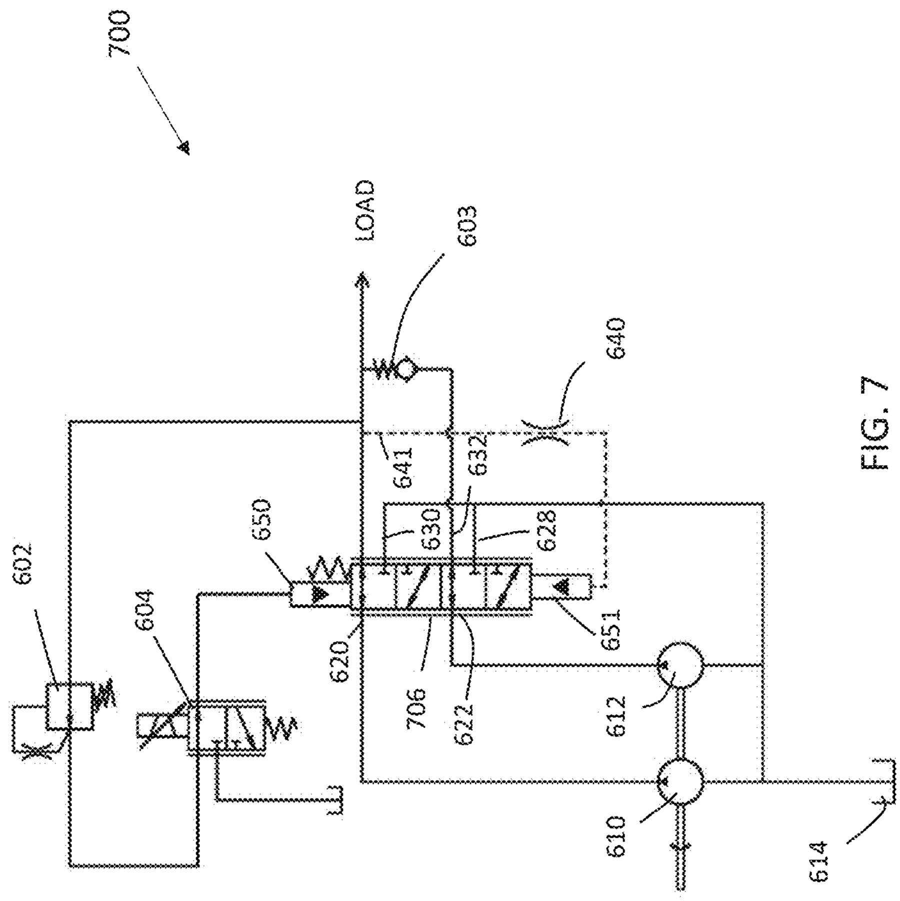
FIG. 7 illustrates a hydraulic schematic diagram of a fixed displacement hydraulic pump match flow demand control system according to another exemplary embodiment.

FIG. 7 illustrates a hydraulic schematic diagram of another binary pump system 600 example. In this configuration, the check valve 603 is positioned in a passage that is coupled between the load and a pump B line passage 632 and a spool valve 706. The spool valve 706 in this example includes two three-way valves, a pump A three-way valve and a pump B three-way valve. Another example may include two two-way valves one for pump A and one for pump B with the use of a check valve between each pump discharge and the line pressure. The three-way valve allows the pump B flow to pass through the spool valve 706 and the check valve 603 to the load when a spool of the spool valve 706 is in a select position. In operation, at low pressure requirement at the load, the spool of the spool valve 706 biases towards the first biasing input 650 which directs pump B flow to pump B return passage 628. As the pressure requirement at the load increases, the spool of the spool valve 706 moves away from the first biasing input 650 towards the second biasing input member 651 redirection pump B flow to the load through pump B line passage 632.

Figure 8:
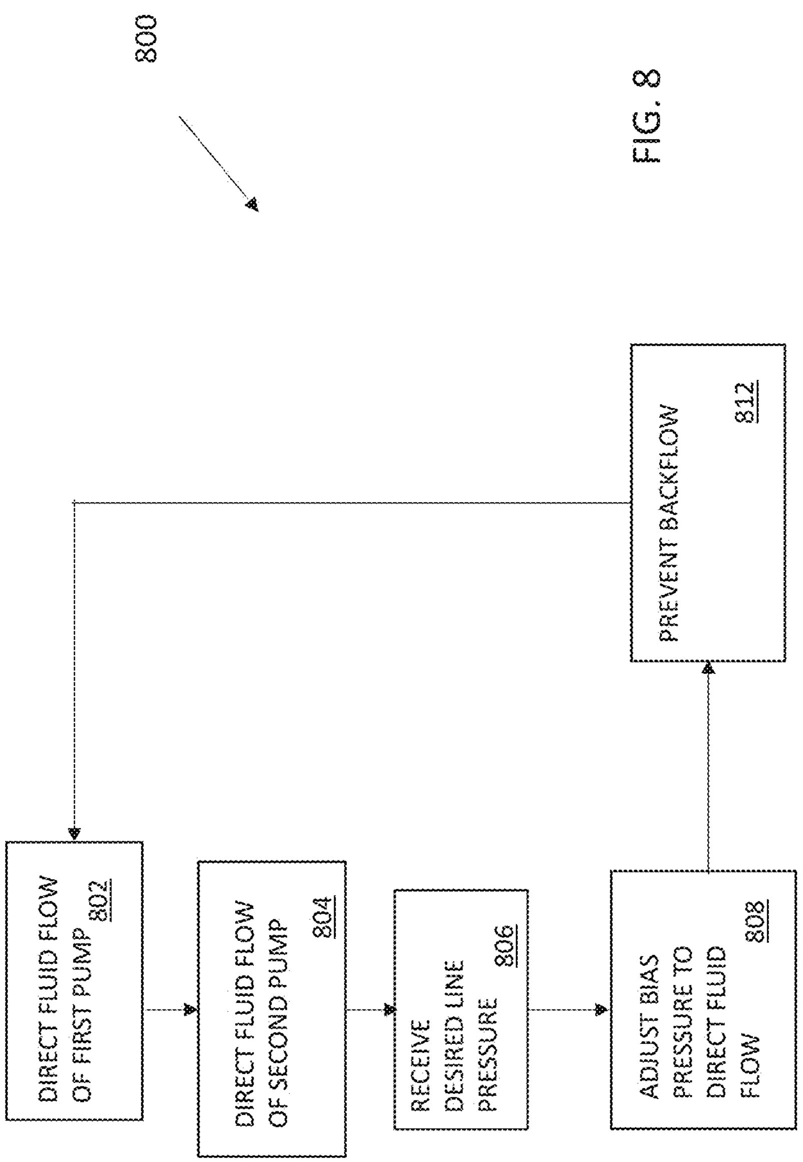
FIG. 8 illustrates a flow diagram of a method of operating a fixed displacement hydraulic pump match flow demand control system according to another exemplary embodiment.

FIG. 8 illustrates a flow diagram 800 method of operating a fixed displacement hydraulic pump match flow demand control system. The flow diagram is set out in a series of sequential blocks. The sequence may be different or occur in parallel in other examples. Hence, the embodiments are not limited to the sequence set out in FIG. 8.

Flow diagram 800 is illustrated as including block 802 where a first fluid flow from a first fixed displacement pump is directed to a first input of a first pump spool gallery formed with the spool within the chamber of the housing of a spool valve. At block 804, at least one second fluid flow from at least one second fixed displacement pump is directed to at least one second input to at least one second spool gallery formed with the spool within the chamber of the housing of the spool valve.

At block 806 a desired line pressure is received from a controller. As discussed above any type of controller that generates a signal, such as a current, that indicated a desired line pressure for the hydraulically operated device may be used. In the transmission controller example, a current is generated and delivered to the pilot valve 604 based on vehicle sensor information. As discussed above other types of controllers may be used include a simple switch or rheostat.

The pilot valve 604 adjust the bias pressure if needed based on the received desired line pressure signal at block 808. The bias pressure is in fluid communication with a pressure control spool gallery formed by an end of the spool within the chamber of the housing of the spool valve. Fluid flow of at least one of a first output from the first pump gallery and at least one second output from the at least one second pump gallery is controlled based on the position of the spool within the cavity of the housing of the spool valve. The first output and the at least one second output are in fluid communication with the hydraulically operated device.

At block 812, backflow in a line passage that is in fluid communication between the at least one second output and the hydraulically operated device is prevented with a check valve. Fluid flow not needed from the first fixed displacement pump and the at least one second displacement pump is directed to one or more return passages with the spool of the spool valve at depending on the location of the spool. The process then continues at block 802.

EXAMPLE EMBODIMENTS

Example 1 includes a fixed displacement hydraulic pump match flow demand control system. The system includes a spool valve, plurality of displacement pumps, at least one line passage, at least one return passage and a control valve. The spool valve includes a housing and a spool. The housing has a chamber that includes a first end and a second end. The housing further has a plurality of input ports. Each input port passes through the housing into the chamber. The housing also has a plurality of output ports. Each output port passes from the chamber through the housing. The housing additionally has a control port passing through the housing to the first end of the chamber and a feedback port passing through the housing to the second end of the chamber. The spool is located within the chamber. The spool is configured to shuttle within chamber based at least in part on a pressure difference between the first end and the second end of the chamber. The spool includes a plurality of blocking sections configured to block at least a portion of at least one of the output ports based on a spool location within the chamber. The spool further includes at least one connection section coupled to space the plurality of the blocking sections. A fluid flow from each fixed displacement pump of the plurality of fixed displacement pumps is in fluid communication with an associated input port of the plurality of input ports of the housing of the spool valve. The least one line passage is in fluid communication with a hydraulically operated device. Each line passage of the at least one line passage is further in fluid communication with an associated one of the plurality of output ports of the spool valve. The at least one return passage is in fluid communication with at least one output port of the plurality of output ports of the spool valve. A line feedback passage is in fluid communication with the feedback port and the at least one line passage. Line pressure from the line feedback passage generates a line pressure force on the second end of the spool within the chamber. The control valve is in fluid communication with the control port of the spool valve. The control valve is configured to provide a select bias pressure that generates a select bias force on the first end of the spool within the chamber to adjust a location of the spool in the chamber to achieve a desired line pressure in the at least one line passage.

Example 2 includes the system of Example 1, further including a controller configured to control the control valve based on a load demand of the hydraulically operated device.

Example 3 includes the system of Example 2, further including a pilot regulating valve in communication with the control valve to regulate variable line pressure to a constant line pressure used by the control valve.

Example 4 includes the system of Example 2, wherein the controller includes an electric solenoid.

Example 5 includes the system of Example 2, further including at least one sensor configured to monitor conditions of the hydraulically operated device. The controller is configured to control the control valve based on an output of the at least one sensor.

Example 6 includes the system of any of the Examples 1-5, wherein the control valve is a solenoid valve.

Example 7 includes the system of any of the Examples 1-6, wherein the blocking sections of the spool are configured to continuously block individual pump flow from passing to the at least one return passage and force the pump flow to the at least one line passage as the spool shuttles in the chamber.

Example 8 includes the system of any of the Examples 1-7, further including a check valve positioned in one of the at least one line passage.

Example 9 includes the system of any of the claims 1-8 wherein the fluid flow from the plurality of fixed displacement pumps is forced to at least one line passage in sequential fashion where the fluid flow from each fixed displacement pump is individually transferred from one of the at least one return passage to one of the at least one line passage as the spool shuttles in the chamber.

Example 10 includes the system of any of the Examples 1-9, further including at least one of a tank in fluid communication with at least one output port of the plurality of output ports of the housing of the spool valve; and a cooling system in fluid communication with at least another one of the output ports of the plurality of output ports of the housing of the spool valve.

Example 11 includes a fixed displacement hydraulic pump match flow demand control system. The system includes a spool valve, a first fixed displacement pump, at least one second displacement pump, a control valve, and a controller. The spool valve includes a hydraulic manifold and a spool. The hydraulic manifold includes a chamber that has a first end and a second end. The hydraulic manifold has a first input port and at least one second input port. Each first input port and the at least one second input port passes through the hydraulic manifold into the chamber. The hydraulic manifold further has a first output port and at least one second output port. Each first output port and the at least one second output port passes from the chamber through the hydraulic manifold. The hydraulic manifold further has a control port that passes through the hydraulic manifold to the first end of the chamber and a feedback port passing through the housing to the second end of the chamber. The spool is received within the chamber having a first end and a second end. The spool is configured to shuttle within chamber based at least in part on a pressure difference between the first end and the second end of the chamber. The spool valve includes a plurality of blocking sections that are configured to block at least a portion of at least one of the first output port and the at least one second output port based on a spool location within the chamber. The spool further includes a plurality of connection sections that are positioned to space the plurality of the blocking sections. An output of the first fixed displacement pump is in fluid communication with the first input port of the hydraulic manifold. An output of the at least one second fixed displacement pump is in fluid communication with the at least one second input port of the hydraulic manifold. At least one line passage is also provided to a hydraulically operated device. Each line passage of the at least one line passage being in fluid communication with an associated output port of the spool valve. Further at least one return passage is in fluid communication with an associated output port of the spool valve. The line feedback passage is in fluid communication with the feedback port and at least one line passage is also included. Line pressure from the line feedback passage generated a line pressure force on the second end of the spool within the chamber. The control valve is in fluid communication with the control port of the spool valve. The control valve is configured to provide a select bias pressure that generates a select bias force on the spool of the first end of the spool within the chamber to adjust a location of the spool in the chamber to achieve a desired line pressure in the at least one line passage. The controller the figure to provide a signal to the control valve relating to a desired line pressure.

Example 12 includes the system of Example 11, wherein the chamber of the hydraulic manifold and the spool are configured to form a first pump spool gallery in fluid communication with the first input port, at least one second pump spool gallery in fluid communication with the at least one second input port and a pressure control spool gallery in fluid communication with the control port.

Example 13 includes the system of any of the Examples 11-12, further including a pilot regulating valve in communication with the control calve to regulate the line pressure to a constant line pressure that is used by the control valve.

Example 14 includes the system of any of the Examples 11-12, wherein the controller includes an electric solenoid.

Example 15 includes the system of any of the Examples Example 11-12, further including at least one sensor that is configured to monitor conditions of a hydraulically operated device. The controller is configured to generate the signal to the control valve based on an output of the at least one sensor.

Example 16 includes the system of any of the Examples Example 11-15 further including a check valve positioned in a line passage that is in fluid communication between the at least one second fixed displacement pump and a hydraulically operated device.

Example 17 includes a method of operating a fixed displacement hydraulic pump match flow demand control system. The method includes directing a first fluid flow from a first fixed displacement pump to a first input of a first pump spool gallery formed with a spool within a chamber of a housing of a spool valve; directing at least one second fluid flow from at least one second fixed displacement pump to at least one second input to at least one second pump spool gallery formed with the spool within the chamber of the housing of the spool valve; adjusting a bias pressure based on a received signal that indicated a desired line pressure to move the spool in the chamber of the housing of the spool valve, the bias pressure being in fluid communication with a pressure control spool gallery formed by an end of the spool within the chamber of the housing of the spool valve; wherein a fluid flow of at least one of a first output from the first pump spool gallery and at least one second output from the at least one second pump spool gallery is based on a position of the spool within a cavity of the housing of the spool valve, the first output and the at least one second output being in fluid communication with a hydraulically operated device.

Example 18 includes the method of Example 17, further including preventing backflow in a line passage that is in fluid communication between the at least one second output and the hydraulically operated device with a check valve.

Example 19 includes the method of any of the Examples 17-18, further including biasing the spool in a select normal position within the cavity of the housing.

Example 20 includes the method of any of the Examples 17-19, further including directing fluid flow not needed from the first fixed displacement pump and the at least one second displacement pump to one or more return passages with the spool of the spool valve.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A fixed displacement hydraulic pump match flow demand control system, the system comprising:

a spool valve, the spool valve including, a housing having a chamber including a first end and a second end, the housing having a plurality of input ports, each input port passing through the housing into the chamber, the housing further having a plurality of output ports, each output port passing from the chamber through the housing, the housing further having a control port passing through the housing to the first end of the chamber and at least one feedback port between the second end of the chamber and a load, and a spool located within the chamber having a first end and second end, the spool configured to shuttle within chamber based at least in part on a pressure difference between the first end and the second end of the chamber, the spool including a plurality of blocking sections configured to block at least a portion of at least one of the output ports based on a spool location within the chamber, the spool further including at least one connection section coupled to space the plurality of the blocking sections;

a plurality of fixed displacement pumps, a fluid flow from each fixed displacement pump of the plurality of fixed displacement pumps in fluid communication with an associated input port of the plurality of input ports of the housing of the spool valve;

at least one return passage in fluid communication with at least one output port of the plurality of output ports of the spool valve;

a line feedback passage in fluid communication with the at least one feedback port and the load, line pressure from the line feedback passage generating a line pressure force on the second end of the spool within the chamber; and a control valve in fluid communication with the control port of the spool valve, the control valve configured to provide a select bias pressure that generates a select bias force on the first end of the spool within the chamber to adjust a location of the spool in the chamber to achieve a desired line pressure.

2. The system of claim 1, further comprising:

a check valve positioned within a line passage between one of the fixed displacement pumps and the load.

3. The system of claim 1, further comprising:

at least one line passage, each line passage of the at least one line passage being in fluid communication with an associated one of the plurality of output ports of the spool valve.

4. The system of claim 1, further comprising:

a controller configured to control the control valve.

5. The system of claim 4, further comprising:

a pilot regulating valve in communication with the control valve to regulate variable line pressure to a constant value used by the control valve.

6. The system of claim 4, wherein the controller controls an electric solenoid.

7. The system of claim 5, further comprises:

at least one sensor configured to monitor conditions of the load, the controller configured to control the control valve based on an output of the at least one sensor.

8. The system of claim 1, wherein the control valve is a linear solenoid valve.

9. The system of claim 1, wherein the blocking sections of the spool are configured to continuously block individual pump flow from passing to the at least one return passage as the spool shuttles in the chamber.

10. The system of claim 1, further comprising at least one of:

a reserve tank in fluid communication with at least one output port of the plurality of output ports of the housing of the spool valve.

11. A fixed displacement hydraulic pump match flow demand control system, the system comprising:

a spool valve, the spool valve including, a housing having a chamber including a first end and a second end, the housing having a plurality of input ports, each input port passing through the housing into the chamber, the housing further having a plurality of output ports, each output port passing from the chamber through the housing, the housing further having a control port passing through the housing to the first end of the chamber and at least one feedback port between the second end of the chamber and a load, and a spool located within the chamber having a first end and second end, the spool configured to shuttle within chamber based at least in part on a pressure difference between the first end and the second end of the chamber, the spool including a plurality of blocking sections configured to block at least a portion of at least one of the output ports based on a spool location within the chamber, the spool further including at least one connection section coupled to space the plurality of the blocking sections;

a plurality of fixed displacement pumps, a fluid flow from each fixed displacement pump of the plurality of fixed displacement pumps in fluid communication with an associated input port of the plurality of input ports of the housing of the spool valve;

at least one return passage in fluid communication with at least one output port of the plurality of output ports of the spool valve;

a control valve in fluid communication with the control port of the spool valve, the control valve configured to provide a select bias pressure that generates a select bias force on the first end of the spool within the chamber to adjust a location of the spool in the chamber to achieve a desired line pressure at one or more output ports of the plurality of output ports; and a check valve positioned within a line passage between one of the fixed displacement pumps and a load.

12. The system of claim 11, further comprising:

a line feedback passage in fluid communication between the feedback port and the load, line pressure from the line feedback passage generating a line pressure force on the second end of the spool within the chamber.

13. The system of claim 11, further comprising:

a controller configured to control the control valve.

14. The system of claim 13, further comprising:

a pilot regulating valve in communication with the control valve to regulate variable line pressure to a constant value used by the control valve.

15. The system of claim 13, wherein the controller controls an electric solenoid.

16. The system of claim 14, further comprises:

at least one sensor configured to monitor conditions of the load, the controller configured to control the control valve based on an output of the at least one sensor.

17. The system of claim 11, wherein the control valve is a linear solenoid valve.

18. The system of claim 11, further comprising at least one of:

a reserve tank in fluid communication with at least one output port of the plurality of output ports of the housing of the spool valve.

* * * * *